US010946671B2

United States Patent
Sar-El et al.

(10) Patent No.: US 10,946,671 B2
(45) Date of Patent: Mar. 16, 2021

(54) SYSTEM FOR PRINTING AND STAMPING EGGS ON CONVEYOR

(71) Applicant: HPT International, LLC., Eatontown, NJ (US)

(72) Inventors: Israel Sar-El, Walden, NY (US); Viktor Kurmis, Pinnegerg (DE)

( * ) Notice: Subject to any disclaimer, the term of this patent is extended or adjusted under 35 U.S.C. 154(b) by 0 days.

(21) Appl. No.: 14/610,280

(22) Filed: Jan. 30, 2015

(65) Prior Publication Data
US 2015/0202889 A1 Jul. 23, 2015

Related U.S. Application Data

(63) Continuation-in-part of application No. PCT/IL2013/050644, filed on Jul. 30, 2013.

(60) Provisional application No. 61/677,508, filed on Jul. 31, 2012.

(51) Int. Cl.
| | |
|---|---|
| *A01K 45/00* | (2006.01) |
| *B41J 3/407* | (2006.01) |
| *B41F 17/30* | (2006.01) |
| *B41J 3/54* | (2006.01) |
| *B41F 17/00* | (2006.01) |
| *A23L 15/00* | (2016.01) |
| *A01K 43/10* | (2006.01) |

(52) U.S. Cl.
CPC ............... *B41J 3/407* (2013.01); *A01K 43/10* (2013.01); *A23L 15/00* (2016.08); *B41F 17/001* (2013.01); *B41F 17/30* (2013.01); *B41J 3/4073* (2013.01); *B41J 3/546* (2013.01)

(58) Field of Classification Search
CPC ......... B65B 23/02; B65B 23/06; B41J 3/4073
USPC .................................................. 347/238; 426/87
See application file for complete search history.

(56) References Cited

U.S. PATENT DOCUMENTS

| | | | |
|---|---|---|---|
| 6,538,767 B1 | 3/2003 | Over et al. | |
| 7,710,444 B2 * | 5/2010 | Hirayama et al. | ............ 347/238 |
| 2004/0220855 A1 | 11/2004 | Carignan | |
| 2006/0138105 A1 * | 6/2006 | Parker ................ | A01K 43/10 219/121.69 |
| 2011/0176901 A1 | 7/2011 | Chait et al. | |
| 2013/0017296 A1 * | 1/2013 | Chait et al. | .............. 426/87 |

FOREIGN PATENT DOCUMENTS

EP   EP0108683 A1   5/1984

OTHER PUBLICATIONS

International Search Report prepared by the International Search Authority/Israel Patent Office in PCT/IL2013/050644.
Written Opinion prepared by the International Search Authority/Israel Patent Office in PCT/IL2013/050644.
International Preliminary Report on Patentability (Ch. II) prepared by the International Search Authority/Israel Patent Office in PCT/IL2013/050644.

* cited by examiner

*Primary Examiner* — Lam S Nguyen
(74) *Attorney, Agent, or Firm* — Ted W. Whitlock

(57) ABSTRACT

Disclosed is a system for marking eggs by stamping and printing thereon.

6 Claims, 5 Drawing Sheets

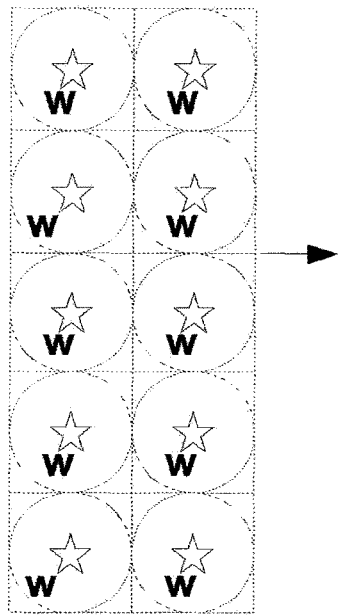
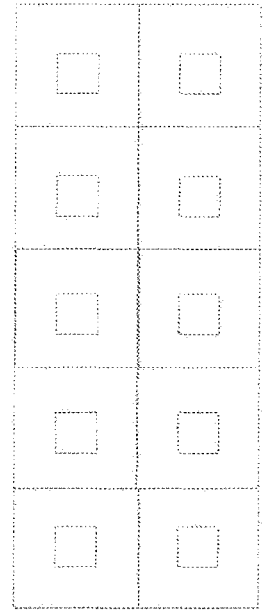
Fig. 2G    Fig. 2H
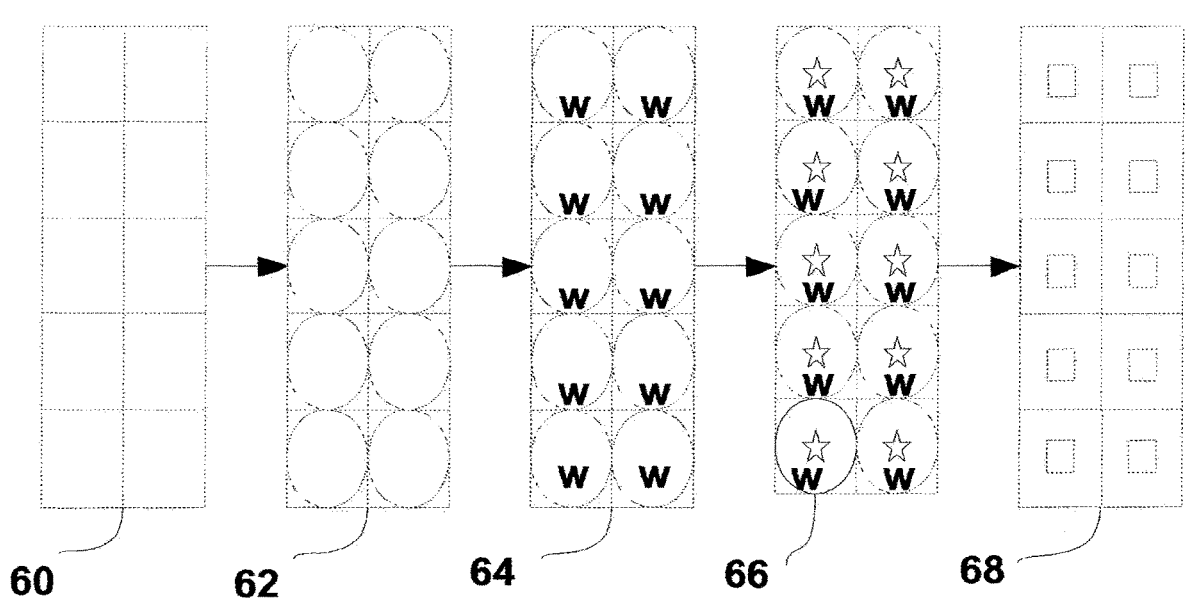
Fig. 3

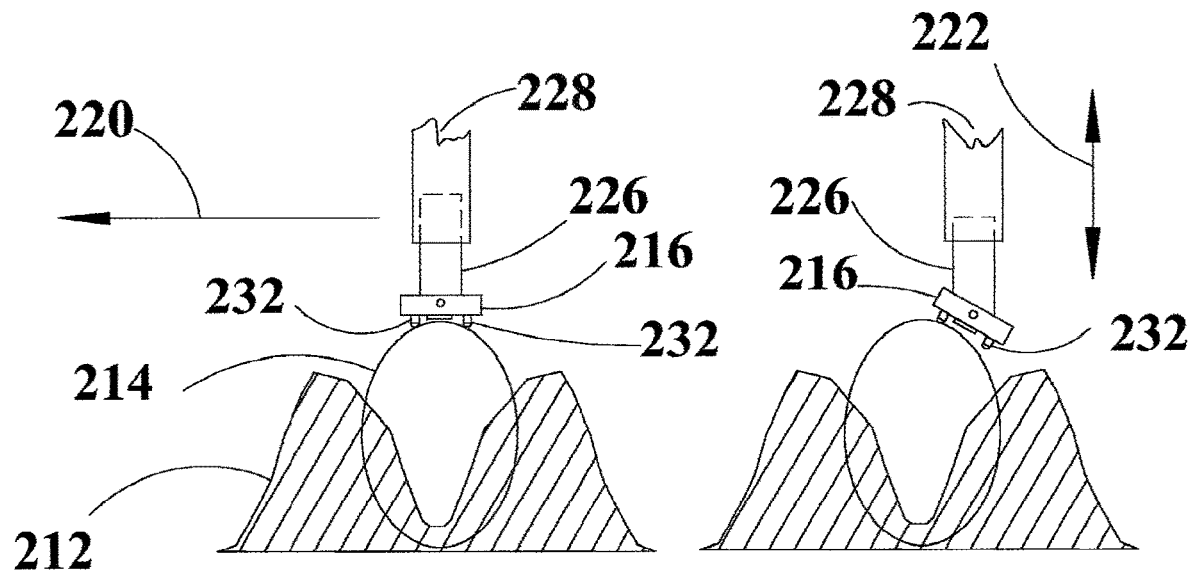
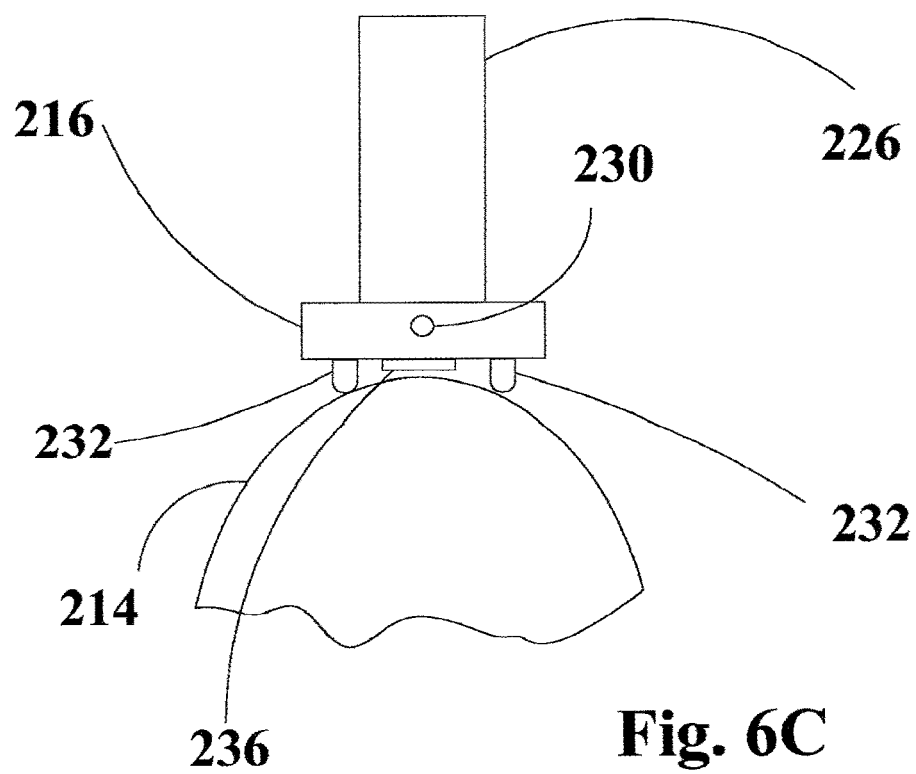
Fig. 6A　　Fig. 6B
Fig. 6C

SYSTEM FOR PRINTING AND STAMPING EGGS ON CONVEYOR

CROSS-REFERENCE TO RELATED PATENT APPLICATIONS

This application claims priority from U.S. provisional patent application 61/677,508 filed at the USPTO on the 31 Jul. 2012, entitled "system for printing and stamping eggs on conveyor"

TECHNICAL FIELD OF THE INVENTION

The present invention relates to a system for marking eggs by stamping and printing thereon.

BACKGROUND OF THE INVENTION

Egg printing also known as egg marking is a way in which information is transferred to an egg, in indelible ink. In some countries egg marking is compulsory in order to make the eggs traceable as to its origin and also as to effective time limits for use. Eggs can become contaminated, smuggled, stolen or otherwise being the subject of unlawful activity, such that their traceability is important for the benefit of the public.

BRIEF DESCRIPTION OF THE DRAWINGS

FIGS. 2A-H schematic description of stages in the marking of egg packages as they travel along with the conveyor belt to be marked by two marking modules;

FIG. 3 is a schematic description of a sequence of stages in the marking of eggs, in accordance with the invention;

FIGS. 6A-B are schematic sections in the egg—Ink jet printer association, showing successive orientations of the print head;

FIG. 6C is an enlarged schematic sections in the egg—Ink jet printer association showing spacers and print head.

DESCRIPTION OF THE PRESENT INVENTION

Figure 1:
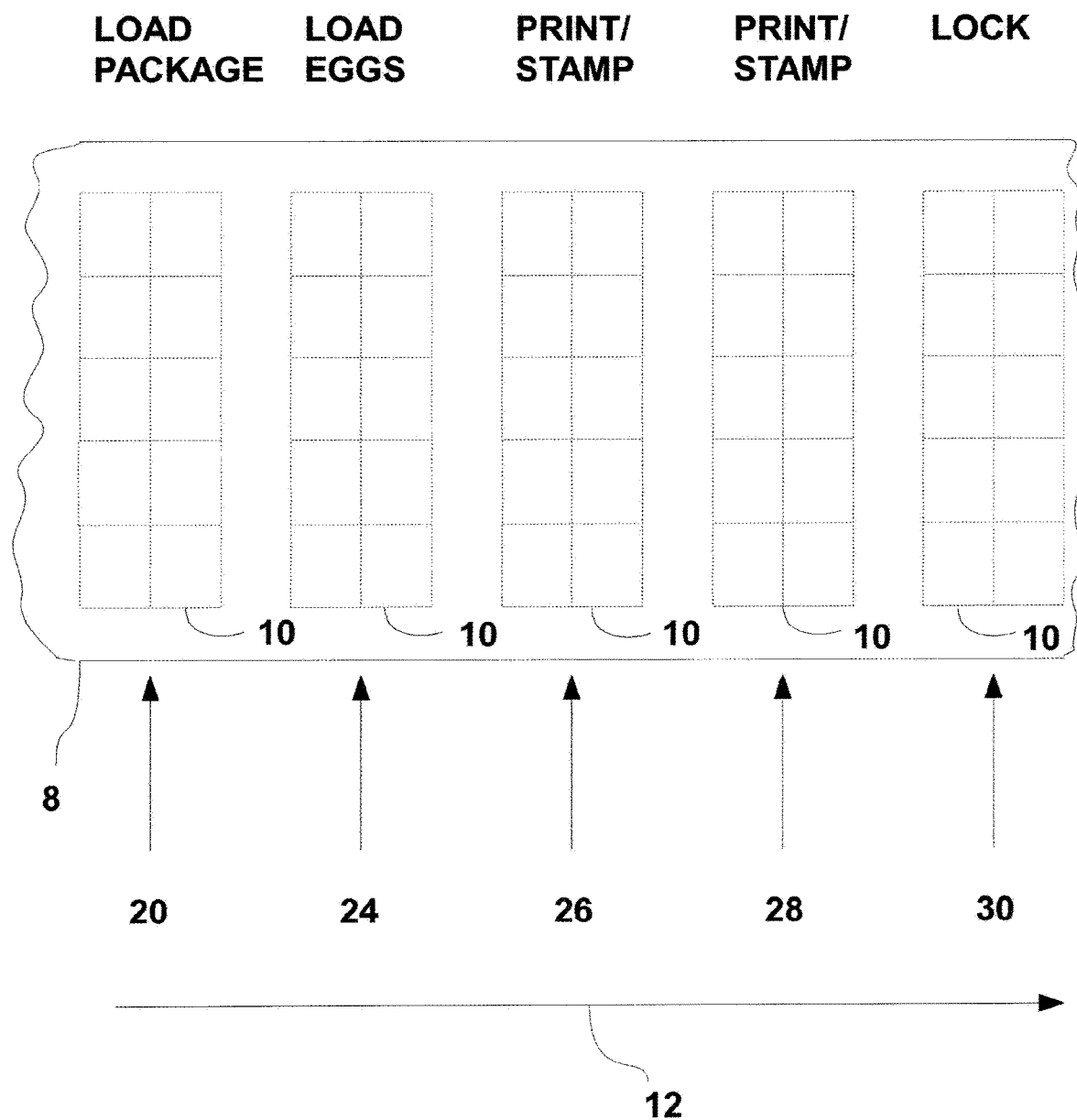
FIG. 1 is a schematic description of basic features of the conveyor system in which the invention is implemented.

The present invention is implemented in a system for commercial packaging and marking of eggs (SPME). The general prior art setup is that of a single conveyor belt having two extreme demarcation, one in which packages and eggs are fed, to be conveyed to another location which is a terminating closing position, being the second demarcation. In accordance with the present invention, functional units, one or more are appended between these two extreme demarcations. In the SPME the eggs are assembled in packages (also known as trays), to be then marked by printing and/or stamping, and optionally securely packaged for further safe haulage to points of sale and/or distribution. The printing or stamping is carried out by two marking modules. The technical setup in which the present invention is implementable is described schematically in FIG. 1. Conveyor belt 8 carries one to several egg packages 10 each including two rows in which eggs are inserted in bins. The row in the direction of the movement will be referred to hereinafter as the advancing row, and the parallel row at the other side is referred to as hind row. The package moves as dictated by conveyor belt 8. In the figure only one single package is shown as conveyed along notable demarcated locations from left to right, in the direction of arrow 12. At location 20 the package is loaded on the conveyor. At location 24 the eggs are loaded into the package, typically one row at a time. The package moves then to location 26 in which place they are printed upon by an electronic printer such as inkjet or laser printer. Commonly, expiration date is imprinted on the eggs. Then as the package moves onwards to the right (in this depiction), it reaches location 28 in which the eggs are stamped each by a stamp which transfers an ink image to the eggs, typically a logo of the marketing firm. At the next location visited, designated 30, the package is covered and locked in preparation to haulage.

The SPME of the invention can also be described as being an architectural concept in which an assembly of modules including at least one printing module, and possibly one stamping module, are aligned adjacent a conveyor. The drive of the conveyor, the stamping module/s and/or printing module/s are all controlled electronically such as by one or more computers, harmonizing the running and stopping of the conveyor with the cyclic activity of the printers modules, and stamp module/s. It is to be noted that in the near future onwards, computer and computing may be carried out by distributed implements, such that the term computer may represent either an instrument or a service received through a communications network.

Figure 2A:
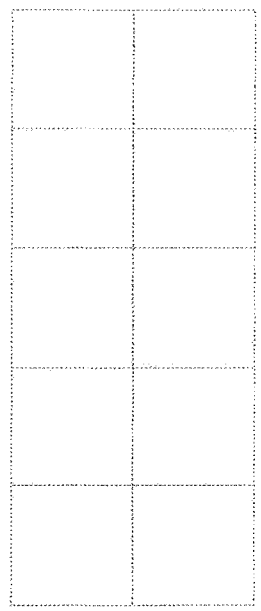
Figure 2B:
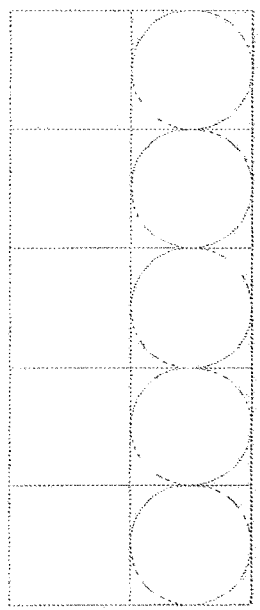
Figure 2C:
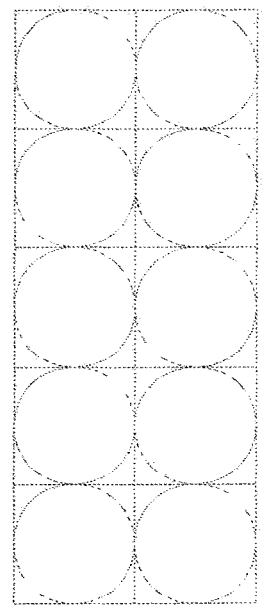
Figure 2D:
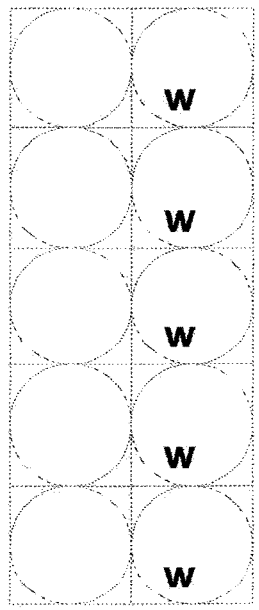
Figure 2E:
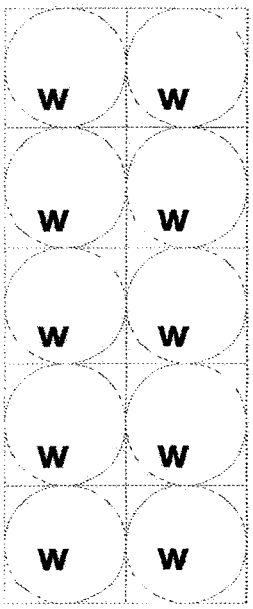
Figure 2F:
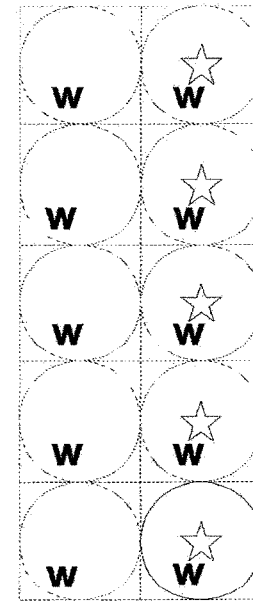

In FIGS. 2A-2H, a more pictorial though schematic description of location succession of an egg package conveyed, as it moves with the conveyor belt is presented. In FIG. 2A an empty package is laid open on the conveyor belt. In FIG. 2B one row of eggs is filled up. In FIG. 2C the two rows are filled up. In FIG. 2D, the eggs in the advancing row are printed upon by an electronic printer such as an ink-jet/laser printer. In FIG. 2E the eggs in the hind row are printed upon as well. In FIG. 2F, the package has arrived at the position in which a stamping/printing appliance is positioned and the eggs are stamped/printed upon, first the advancing row, and in FIG. 2G the hind row as well. In FIG. 2H the hitherto open package is covered and the cover secured so as to keep the package protective of the eggs placed inside.

The successions of major statuses (stages) that typify a package as it moves on a conveyor belt are summarized in FIG. 3 which is a time series. Open and empty package status 60 changes to filled status 62, which changes to printed status 64, which changes to stamped status 66, and finally closed and secured status 68.

Figure 4:
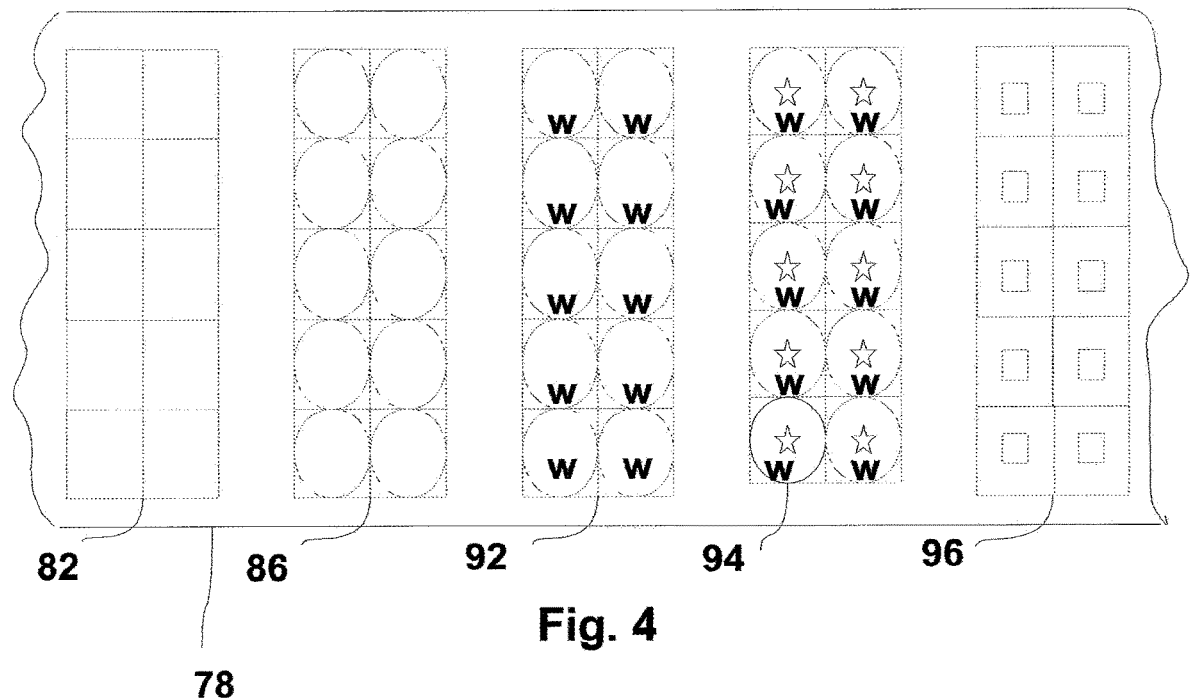
FIG. 4 is a schematic description simulating a single shot taken at a specific time, of the conveyor, showing egg packages at different stages.

In FIG. 4, all packages on the conveyor belt are different packages and therefore the succession of packages shown is not a time series but a depiction of a sample schematic picture taken at a single moment on the conveyor belt 78, excluding intermediate stages. Package 82 is an open and empty package. Package 86 is filled with eggs at both rows. In package 92 all the eggs are printed/stamped upon, and in package 94 all the eggs are printed/stamped upon (as well as printed upon). Package 96 at the right end of the conveyor, demonstrates a closed lid, secured and ready for haulage.

The movement of the conveyor belt is not however uniform, apart from servicing the conveyor, the printers and stamping machine and all control circuitry, the conveyor belt has specific cyclic running characteristics. Thus, when the empty egg package arrives at the location in which the eggs are to be loaded, namely the position of package 86, the conveyor must stop for the eggs to be loaded into the bins.

Additionally, the eggs when arriving at the location of package 94 are to be stamped requiring the conveyor to stop because for stamping, the eggs must stand still. Therefore in accordance with the present invention, the conveyor belt stops, creating an intermission in the movement in which two events take place: a. filling eggs at position of package 86 and b. simultaneous stamping at position of package 94, at the direction of the conveyor.

Therefore in order to stop package 94, which is passively driven by the conveyor belt, all the other packages are stopped and all activity stopped. In order to overcome such a problem, the stamping unit in the SPME can be replaced by a printing unit in the machine which does not require stopping of the package to be printed upon together with packages 82, 86, 92 and 96. The advantage of having two printing units in one SPME instead of one printing unit and one stamping unit, is that of uniform control interfaces and wider visual printing capabilities. Whereas a stamp has one color and cannot easily be programmed to change images, except by changing the stamps. The printing units produce colorful images and can be easily programmed to print specific images, text or ornaments.

The SPME of the invention is designed to accommodate each package that may be available and or required in the market. For different size packages, respective assembly parameters and aligning dimensions are to be applied in order to accommodate for the specific packages used in a specific run, for example the number of rows in each package.

Figure 5:
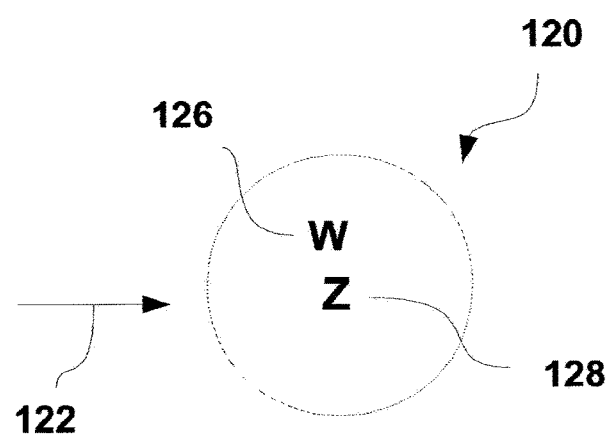
FIG. 5 is a schematic description of printing zones on an egg.

In another embodiment of the invention, more than one printing units in are employed in one SPME for marking the eggs. In this particular aspect, the extra printing unit is applied in the SPME not besides the first printing machine alongside the conveyor belt to provide a succession of printing locales, but rather it is assembled to increase the size of the printouts across the conveyor belt. This is explained in connection with FIG. 5 in which egg 120 the top of which is shown, moves placed within a package, (not shown), in the direction of the conveyor as indicated by arrow 122. Image or graphic mark 126 is printed by one printing unit while image or graphic mark 128 is printed by another printing unit. This specific architectural property is intended to increase the size of the printouts across the conveyor belt on the eggs by adding more width to the printouts and enriching the data conveyed by the printouts. Some other aspects of the invention are to follow.

Implementation of the Inkjet Print Head as a Marker

In accordance with the present invention, an inkjet print head (IJP) is borne on a overhanging support piece (OHSP), which is pivoted in order to allow the OHSP and the attached IJP to follow the curvature of the egg, while the IJP deposits ink. Reference is made to FIGS. 6A-C that help explain how the dynamic printing process progresses. Egg tray 212 supports rows of eggs as known in the art. Egg 214 resting in tray 212, is approached by OHSP 216 as egg tray 212 moves in the direction of arrow 220. OHSP descends or rises as indicated by arrow 222, as OHSP, pivotally connected to, and hanging on lead 226, Typically lead 226 retains all the electronic connections and ink supply to the IJP supported by the OHSP. Lead 226, is moveable up and down as guided by a mechanism represented in the FIGS. 6A and 6B by sheath 228. In FIG. 6C some subtle but important features of the printing mechanism are described schematically. OHSP 216 is pivotable by the application of a swivel 230 connecting between OHSP 216 and lead 226. Spacers or gliders 232, at least one, resembling in their functionality acam follower in mechanical devices to the extent that they follow the curvature of the egg, keeping a constant distance from the shell. Last and indispensable in this embodiment is the IJP 236.

It should be understood that the marking on an egg may be done by a single printing head. Furthermore, each printing head is not limited to print a single line and it may print a multitude of lines, for example, two or three lines.

Random Number Printing

Ink jet printing is a complex process controlled by a computer. The same computer controlling the printing or another computer can be used to calculate identity numbers for eggs in batches, or for each individual egg. Identifying batches or eggs and/or their origin, their distributing company, or weight, quality control code or else. The same computer or another one can calculate random numbers and present them to the printer/s to print on the eggs, facilitating the tracking of forges. ID numbers can be printed as ASCII code or barcodes (typically 2 dimensional), or indeed any suitable image. Random numbers in the present invention relate to all kinds of combinations of numbers, letters or signs.

According to some embodiments, all the printing heads are wired to the computer which operates as a central control system. However, the wiring suffers from the following disadvantages: (a) necessity to provide a convenient path to the cables that is accessible for inspection and repairs, (b) cost of cables and wiring installation, (c) frequently, cables are eaten by mice, a fact that causes malfunctioning of the printers, necessity to stop the printing line, time loss and repair cost.

Therefore, according to preferred embodiments and in order to overcome the aforementioned disadvantages, all the printing heads are controlled by the central control system through WiFi, thus eliminating the need of control cables and their deficiencies as described above. In this manner, controlling the operation of the printing heads is carried out by a tablet PC or the like, a solution that is more convenient and reliable with respect to the described above when the printing heads are wired to the central controller.

Advantages of the SPME of the Present Invention

Prominent advantageous assembly features and functional properties as provided by the invention are as follows: The SPME is a single system which includes two marking units, a printer and a stamping unit, or two printer units assembled all as modules. Installation and servicing is relatively fast, as each of the modules is set in place and then alignment is carried out for all modules. Notably, the two events take place at each intermission, egg placement and stamping, require alignment employing a constant distance from one another and from markers in the SPME. Alignment of the printer/s and stamping unit/s is part of the single aligning scheme taking into consideration the alignment of the modules in the intermission. For improving and simplifying servicing and aligning, a single man—machine interface can be employed so that quick and easy tuning of the SPME is achieved, both electronically and mechanically.

The aspects of the present invention providing for the implementation of inkjet printing are advantages firstly because laser printing can be obviated. Laser printing cannot be performed while there is a relative movement between the egg and the printing head. In inkjet printing, the relative movement between the egg and the IJP does not preclude printing. The laser printing is inherently slower as it requires complete halt of the egg trays while printing is executed. Moreover, inkjet printing does not require contact forming between the printing head and the printed object, i.e. egg in this particular case. Additionally, laser printing on eggs is not as versatile as ink jet printing with respect to the curvature of the eggs since to print head of the IJP is much narrower in the direction of movement of the eggs. The IJP can surf the face of the egg shell and print while changing aspect, gliding along the curvature of the egg. Laser printer head cannot accommodate to changing aspects as much and therefore need a priori a larger piece of relatively flatter surface, such as on the side of the egg. The present invention can be applied to eggs positioned with their round end pointing upwards or their pointed end (called the taglion) pointing upwards.

The invention claimed is:

1. A system for commercial marking of eggs after they are loaded into packages and before the eggs are covered, wherein the packages loaded with the eggs are conveyed in a predetermined direction on a conveyor belt, the system comprising:

a position on the conveyer belt where the packages are loaded with eggs in a way that a taglion of the eggs is pointing upwards, and wherein the conveyor belt is moving in a direction towards a position in which the packages are covered and locked to haulage;

at least two separate marking modules positioned in a sequence between the position on the conveyer belt where the packages are loaded with eggs and the position in which the packages cover the eggs, wherein at least one of said at least two separate marking modules is an ink jet printer having an inkjet print head configured to print the marking on the pointed end (taglion) of the eggs, wherein the eggs are within the packages and the taglion is pointing upwardly, and wherein said inkjet printer head is borne by an overhanging support piece to which it is attached, and wherein said overhanging support piece is pivotally connected to a lead to follow a curvature of the taglion, and wherein said lead is moveable up and down keeping a distance from a surface of the taglion as dictated by spacers on the overhanging support piece wherein at least one of said at least two separate marking modules is a stamping unit and wherein at the position of the stamping unit on the conveyor belt, the conveyor belt stops and the eggs stand still to be stamped, and wherein simultaneously, when the conveyor belt stops at the position of the stamping unit, the eggs are being loaded at the position on the conveyer belt where the packages are loaded with eggs.

2. The system as in claim 1, wherein said at least two separate marking modules are ink jet printers.

3. The system as in claim 1, wherein said at least two separate marking modules are controlled by a single computer.

4. The system as in claim 1, wherein the marking is done by a single printing head.

5. The system as in claim 4, wherein the single printing head prints a multitude of lines.

6. A commercially marked egg in which a marking on a pointed end (taglion) of an egg is produced after the egg is loaded into a package and before the marked egg is covered, wherein the package is conveyed on a conveyor belt from a position in which the egg is loaded to a position in which the marked egg is covered, by a process comprising:

loading the egg in the package in a way that the taglion of the egg is pointing upwardly;

moving the conveyor belt with the package loaded with the egg;

providing at least two separate marking modules and positioning them in a sequence between the position in which the egg is loaded and the position in which the egg is covered, wherein at least one of said at least two separate marking modules is an ink jet printer having an inkjet print head for printing the marking on the taglion, wherein the egg is within the package and the taglion is pointing upwardly, and wherein said inkjet printer head is borne by an overhanging support piece to which it is attached, and wherein said overhanging support piece is pivotally connected to a lead to follow a curvature of the taglion, and wherein said lead is moveable up and down keeping a distance from a surface of the taglion as dictated by spacers on the overhanging support piece;

marking the taglion by the inkjet print head while the egg is loaded in the package and is moved by the conveyor belt, and covering the marked egg so as to be locked to haulage, wherein at least one of said at least two separate marking modules is a stamping unit and wherein the process further comprising: stopping the conveyor belt at a position of the stamping unit wherein the egg stands still to be stamped, and wherein the process further comprising simultaneously stopping the conveyor belt at the position of the stamping unit and at the position in which the egg is being loaded.

* * * * *